United States Patent [19]

Johnson et al.

[11] 4,159,451
[45] Jun. 26, 1979

[54] COAXIAL GLASS GAS LASER TUBE

[76] Inventors: Brian Johnson, 5 Hardwick Green, Ealing London W 5, England; Manfred Hübner, Genslerstrasse 4, 2000 Hamburg 60, Fed. Rep. of Germany

[21] Appl. No.: 813,935

[22] Filed: Jul. 8, 1977

[51] Int. Cl.² .............................................. H01S 3/03
[52] U.S. Cl. .............................. 331/94.5 D; 331/94.5 G
[58] Field of Search .................... 331/94.5 C, 94.5 D, 331/94.5 G; 330/4.3

[56] References Cited
U.S. PATENT DOCUMENTS

| | | | |
|---|---|---|---|
| 3,792,372 | 2/1974 | Mark | 331/94.5 D |
| 3,875,530 | 4/1975 | Manoukiam | 331/94.5 D |
| 3,916,336 | 10/1975 | Kaiser | 331/94.5 D |
| 3,955,152 | 5/1976 | Lewis | 331/94.5 D |
| 4,035,741 | 7/1977 | Crisp et al. | 331/94.5 G |

*Primary Examiner*—William L. Sikes
*Attorney, Agent, or Firm*—James R. Cypher

[57] ABSTRACT

The invention concerns a coaxial glass gas laser tube, consisting of a capillary tube connecting at its inner open end with a surrounding cylindrical space bounded by an outer tube enclosing the capillary tube, an end wall located at some distance from the inner end of the capillary tube, and a termination opposite the latter, which joins the capillary tube to the outer tube; one optical element is located on the end of the capillary tube extending past the end of the outer tube, and the other on the end wall.

5 Claims, 2 Drawing Figures

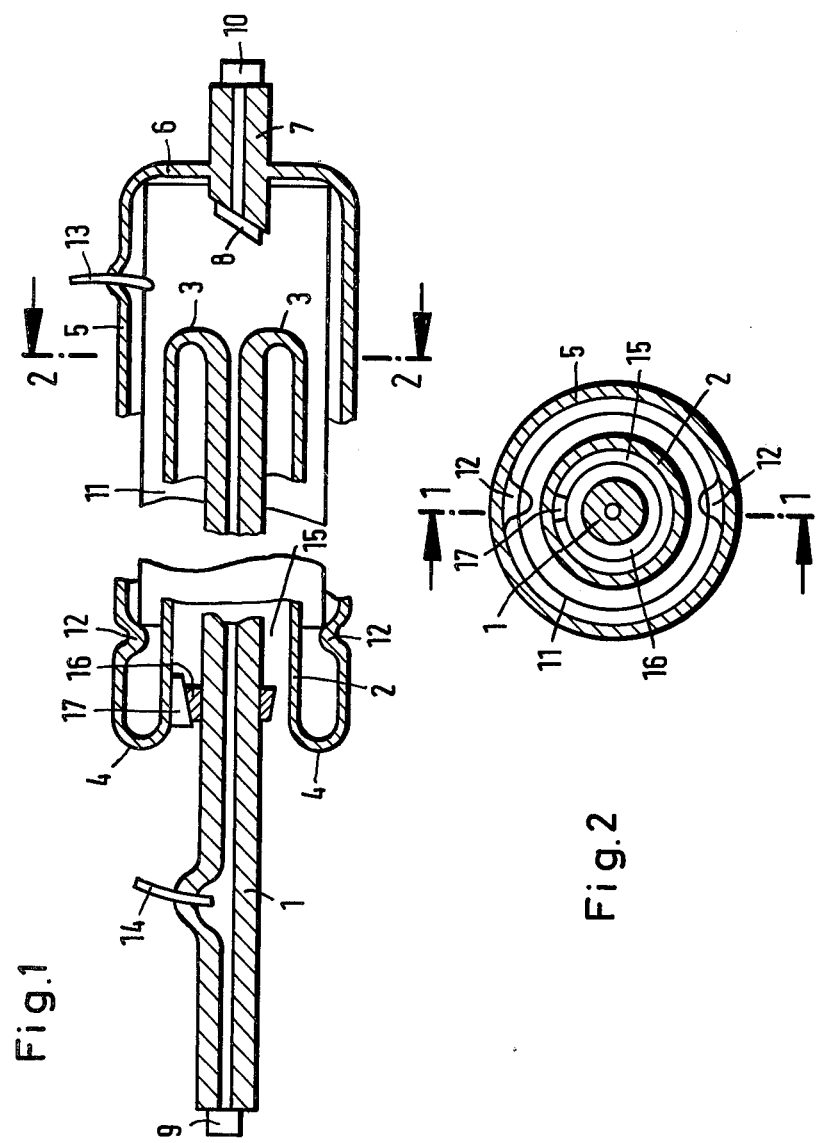

COAXIAL GLASS GAS LASER TUBE

BACKGROUND OF THE INVENTION

Such a tube is similar to the cantilever tube shown in FIG. 3 of U.S. Pat. No. 3,787,780. There the capillary tube is joined to the outer tube by means of a ring-shaped wall, which is firmly attached to the capillary tube on its inside edge and the outer tube on its outside edge. With this design and other familiar ones, such as those which have the capillary tube supported at both end walls of the outer tube, the extremely exact alignment of the two optical elements, which is essential, can be achieved only with great difficulty during production. Only when the units are tested can it be determined whether the alignment is adequate. For that reason, many defective units are inevitably produced. Other familiar designs provide for closing the capillary tube on the open end with a clear glass screen or with a brewster window, with the optical element to be attached to the tube by means of an adjusting apparatus. An optical element so attached can be adjusted during operation of the gas Laser tube, but it is vulnerable to the effects of dirt, shocks and the like. Attaching the optical element by means of a flexible metal tube requires glass-to-metal couplings, as long as the usual glass tubes are retained, making the units expensive and fragile.

In the area of parallel arm laser tubes, which have the outer tube located parallel and adjacent to the capillary tube, methods of adjustment have been developed which are considerably more advantageous, especially for mass production. The optical elements are fixed on the ends of the capillary tube in approximately parallel position. When the device is to be used, fine adjustment is made by means of a mechanism attached to the free ends of the two tubes. The capillary tube is bent slightly until the optical elements are parallel. The chief disadvantages of the parallel arm laser tube are its large size and its instability when heated, because of its asymmetrical design.

SUMMARY OF THE INVENTION

The object of this invention is to develop a coaxial glass gas laser tube of the cantilever type with a unique structure which offers a simple means of precisely adjusting the alignment of the optical elements, without making the device difficult or expensive to produce.

The invention attains this object by locating an intermediate tube inside the outer tube which fits around the capillary tube without touching the capillary tube except at its inner end. The intermediate tube is joined at one of its ends to the inner end of the capillary tube and at the other to the end of the outer tube opposite the end wall. An entire unit of this type can be manufactured out of glass, the usual material, by a glassblower using simple techniques, who merely needs to join the tubes at their ends one at a time. Exact centering of the tubes is not essential in this operation. The optical members can be fastened on in the usual way after being positioned approximately parallel. The necessary fine adjustment of the optical members can be made in a way analogous to the fine adjustment of a parallel arm tube, by adjusting the position of the free end of the capillary tube in relation to the free ends of the intermediate tube and the outer tube, which are joined to each other. The present invention makes possible for the first time a coaxial tube which allows this opportunity for fine adjustment. The auxiliary techniques which are otherwise usual, such as positioning the entire tube in an auxiliary frame or mounting the optical elements at either end of the unit on adjustment members, can be omitted. The production costs of this type of tube can be lowered considerably while maintaining all the positive features of the coaxial laser tube, such as its compactness. This tube has the advantage over the parallel arm tube that the capillary tube itself need not be bent nearly as much. Rather, it is the transition area from capillary tube to intermediate tube, or else the intermediate tube itself, that gives way, so that the capillary tube remains straight. For that reason, deformations of the tube produced by heat when the unit is put into operation are less pronounced. In any case, the symmetrical construction of this tube makes it superior to the parallel arm tube with regard to thermal stability.

The coaxial glass gas laser tube of the invention has the further advantage that at the end of the intermediate tube connected to the outer tube, between the intermediate tube and the capillary tube, an adjustable spacer is located. Such an adjustable spacer permits fine adjustment and can be advantageously located in the space between the tubes, where the spacer is protected from accidental jolts and does not increase the space required for the unit, in particular the important outside diameter.

The coaxial glass gas laser tube of the invention has the further advantage that the adjustable spacer is so designed as to permit adjustment of its own width, making possible a radial adjustment of the two tubes at any angle. In this way, the desired direction and amount of bending can be quickly determined in the process of fine adjustment, so that the time necessary for such fine adjustment is greatly reduced by virtue of this systematic procedure.

The coaxial glass gas laser tube of the invention has the further advantage that the spacer consists of a wedge which is driven into the space between the tubes. Such a wedge, which can be driven in at the necessary point to the necessary depth and can be secured afterwards by glueing or some other means, represents the simplest and cheapest means of fine adjustment.

The coaxial glass gas laser tube of the invention has the further advantage that in the end wall, aligned with the long primary capillary tube, a short capillary tube is located, which has the optical element mounted on its outer end. This has the particular advantage that the same means of fastening and the same type of optical element can be used on both ends. Besides that, the short capillary tube lengthens the resonating cavity and thus provides for better control of the modes arising in the resonator.

The coaxial glass gas laser tube of the invention has the final advantage that the inner end of the short capillary tube is fitted with a Brewster window. With this construction, it is a simple matter to add another Brewster window to the unit, thus making it possible to polarize the beam.

BRIEF DESCRIPTION OF THE DRAWINGS

The figures provide schematic examples of the invention, as follows:

FIG. 1 shows an axial section along the line 1—1 in FIG. 2, and

FIG. 2 shows a section along the line 2—2 in FIG. 1.

DESCRIPTION OF THE PREFERRED EMBODIMENTS

The laser tube illustrated is made of glass. A capillary tube 1 is, as FIG. 1 shows, connected at one end with an intermediate tube 2. The intermediate tube 2 is aligned coaxially with the capillary tube 1 and is continuous with it at the transition point 3, where a simple inside curve, easily produced by a glassblower, joins the two. The other end of the intermediate tube 2 is curved out at 4 and joined to the end of an outer tube 5 concentric with it. This transition point is also easily produced by the glassblower.

At a short distance from the inner end 3 of the capillary tube 1, the outer tube 5 is sealed with an end wall 6, in which a short capillary tube 7 is set, in alignment with the original capillary tube 1. The short tube 7 is fitted with a Brewster window 8 on its inner end. The Brewster window is positioned at an angle of about 55° to the tube axis. A first optical element 9 is positioned at the extreme end of the capillary tube 1 and a second optical element 10 at the extreme end of the short capillary tube 7.

Between the outer tube 5 and the intermediate tube 2, a cylindrical cathode plate 11 is aligned parallel to the axis. The cathode plate lies against the end wall 6 and is held in place at the other end by impressions 12 in the outer wall 5. Between the impressions 12 and the end of the ring-shaped space at end 4 there is room for additional devices, such as a getter arrangement or the like. The cathode 11 is connected to a wire 13 which passes through the outer wall 5. An anode wire 14 passes through the wall of the capillary tube 1 near the optical element 9. The gas discharge necessary to obtain the laser effect burns between the anode 14 and the cathode 11, i.e. over most of the length of the capillary tube, which is shortened in the drawing to facilitate the illustration.

At the open end of the space 15 enclosed between the capillary tube 1 and the intermediate tube 2, a conic ring 16 is pushed onto the capillary tube 1. This ring 16 carries a wedge 17, which slides along the outer edge of the ring. The unit is manufactured in the usual manner. Before the end wall 6 is put on, the cathode plate 11, as well as the getter arrangement or the like, are inserted. The Brewster window 8 is also attached to the short tube 7, which has already been fixed to the end wall 6, before the end wall is attached to the unit.

After the unit has been completed, it is provided with the optical elements 9 and 10, which are fixed by glueing or some other method after they have been located in approximate alignment. The unit is cleaned, filled with gas and put into operation. During operation, the laser beam is observed and the wedge 17 driven into the enclosed space 15 in accordance with the observed beam. If the observed change does not correspond to the desired change in the beam, the adjusting mechanism is turned about the axis of the capillary tube, until the desired angle is obtained. The wedge 17 is now moved along the axis until the error is eliminated.

The wedge 17 can be designed as a fixed unit with the conic ring 16, which after adjustment is secured by glueing. The two members 16 and 17 can, however, also be connected by appropriate mechanical apparatus, such as adjusting screws or the like. In the simplest version of the device, a wedge can be utilized alone, which is simply driven between the intermediate tube 2 and the capillary tube 1.

We claim:
1. A coaxial glass gas laser tube comprising:
   a. a capillary tube (1) having a first end and second end (3);
   b. an outer tube coaxially surrounding said capillary tube and having an end wall (6) spaced outwardly from said second end (3) of said capillary tube and an end (4) spaced inwardly from said first end of said capillary tube;
   c. an intermediate tube (2) coaxially positioned between said capillary tube and said outer tube and connected at one end (3) to said second end of said capillary tube and connected at the other end (4) to said outer tube;
   d. a first optical element (9) located on said first end of said capillary tube;
   e. a second optical element (10) located on said end wall; and
   f. radially operating adjustable spacer means (16, 17) located between said capillary tube and said intermediate tube adjacent said other end (4) of said intermediate tube.
2. A laser tube as described in claim 1 comprising:
   a. said spacer means (16, 17) consists of a device for adjusting its width on one side of said capillary tube permitting a radial adjustment which spacer means can be turned about the axis of said capillary tube.
3. A laser tube as described in claim 1 comprising:
   a. said spacer means consists of a wedge (17) which can be driven into the space between said capillary and intermediate tubes.
4. A laser tube as described in claim 1 comprising:
   a. a short capillary tube (7) mounted on said end wall in alignment with said capillary tube (1); and
   b. said second optical element (10) is mounted on the outer end of said short tube.
5. A laser tube as described in claim 4 comprising:
   a. A Brewster window (8) mounted on the inner end of said short capillary tube (7).

* * * * *